(12) United States Patent
Shin

(10) Patent No.: US 10,168,178 B2
(45) Date of Patent: Jan. 1, 2019

(54) NAVIGATION DEVICE AND CONTENT OUTPUT CONTROL METHOD THEREOF

(71) Applicant: SK PLANET CO., LTD., Seongnam-si, Gyeonggi-do (KR)

(72) Inventor: Jin Chul Shin, Suwon-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 73 days.

(21) Appl. No.: 15/013,689

(22) Filed: Feb. 2, 2016

(65) Prior Publication Data
US 2016/0223353 A1    Aug. 4, 2016

(30) Foreign Application Priority Data

Feb. 2, 2015   (KR) .................. 10-2015-0016238

(51) Int. Cl.
*G01C 21/20*   (2006.01)
*G01C 21/36*   (2006.01)

(52) U.S. Cl.
CPC ................. *G01C 21/3697* (2013.01)

(58) Field of Classification Search
CPC ................................................. G01C 21/3697
USPC ......................................... 701/431, 439, 456
See application file for complete search history.

(56) References Cited

U.S. PATENT DOCUMENTS

| | | | |
|---|---|---|---|
| 2010/0222078 A1* | 9/2010 | Tysowski | G01C 21/3682 455/456.3 |
| 2013/0311038 A1* | 11/2013 | Kim | G01C 21/3641 701/36 |

FOREIGN PATENT DOCUMENTS

| | | | | |
|---|---|---|---|---|
| KR | 20100106864 A | * | 10/2010 | |
| WO | WO 2012089284 A2 | * | 7/2012 | G01C 21/3697 |

OTHER PUBLICATIONS

Machine Translation: Jin Seung Hee, KR 20100106864 A, Oct. 2010, Korean Patent Publication.*

* cited by examiner

*Primary Examiner* — Nadeem Odeh
(74) *Attorney, Agent, or Firm* — Brinks Gilson & Lione

(57) ABSTRACT

The navigation device according to the present invention comprises a position information identifying unit for identifying at least one of a current moving speed and a position of the moving object, a safety level determining unit for determining safety level information about an output of content based on the at least one of the moving speed and the position of the moving object, a content receiving unit for receiving content via a network, and a control unit for controlling the output of the received content according to the safety level information.

2 Claims, 8 Drawing Sheets

NAVIGATION DEVICE AND CONTENT OUTPUT CONTROL METHOD THEREOF

CROSS-REFERENCE TO RELATED APPLICATION

This application is based upon and claims the benefit of priority from Korean Patent Application No. 10-2015-0016238, filed on Feb. 2, 2015, the entire contents of which are incorporated herein by reference.

1. Field of the Invention

The present invention relates to a navigation device and a content output control method for the navigation device and, more specifically, to a navigation device and a method for the navigation device of controlling an output of the received content according to a safety level of the moving object in the navigation device, which can output video content or audio content, which is received from an external server, while providing position information and moving path information of a moving object such as a vehicle.

2. Description of the Related Art

A navigation device is a device which is mounted on a moving object such as a vehicle, etc. and it performs a functionality of measuring position information of the moving object and providing path information from a current position to a destination position based on the measured position information. This navigation device can identify a current position by receiving a global positioning system (GPS) signal from a GPS satellite, and provides information such as a position of the moving object, a moving direction, a distance to the destination, and moving path, etc. based on the identified position.

Meanwhile, thanks to the progress in mobile communication techniques and microprocessors, various types of applications can be installed to be utilized on a portable terminal such as a smartphone. Therefore, the navigation device, which had been implemented as a standalone hardware device to be used in a vehicle, comes to be realized as software which is installed on the portable terminal.

Since the portable device comes to be equipped with the navigation functionality, the navigation functionality can be enhanced with peripheral real time traffic information and an optimal path finding algorithm in combination with mobile communication functionality of the portable terminal, and, furthermore, various types of content such as advertisement, news, and digital multimedia broadcasting (DMB) can be displayed to be overlapped on a navigation screen.

Although various types of content can be output on the portable terminal which is equipped with the navigation functionality, the navigation functionality is mostly used while a vehicle is moving, and it can be dangerous to expose these types of content to users while driving. Therefore, most navigation software which is currently used on the portable terminal normally exposes a voice advertisement of a screen advertisement to the user only when the navigation software is initially launched or after the vehicle arrives at the destination.

Meanwhile, the description set forth as the background of the invention in the above is merely provided to ease the understanding on the background of the invention, and it can no way be regarded as an admission as the prior art which is already known to a person with an ordinary skill in the art.

SUMMARY OF THE INVENTION

An objective of the present invention is to provide a navigation device which can minimize the danger incurred by watching content during driving while maximally increasing an exposure frequency of the content by measuring a safety level for an output of the content according to a moving speed and a position of a moving object and then controlling the output of the content which is received from outside according to the measured safety level, and a method of controlling the output of the content for the navigation device.

In order to accomplish the objectives, the navigation device according to an embodiment of the present invention comprises: a position information identifying unit for identifying at least one of a current moving speed and a position of the moving object; a safety level determining unit for determining safety level information about an output of content based on the at least one of the moving speed and the position of the moving object; a content receiving unit for receiving content via a network; and a control unit for controlling the output of the received content according to the safety level information.

Here, the safety level determining unit can identify place information which is matched with the identified position of the moving object, when it is identified that the moving object is stopped, and predict a stop period of the moving object according to the place information.

Here, the safety level determining unit can determine the safety level information based on the predicted stop period.

Here, the safety level determining unit can predict the stop period of the moving object according to the kind of the place information.

Here, the received content can include video content and audio content, and the control unit can block the output of the received content, when the moving object is moving.

Here, the control unit can output either the video content or the audio content according to the safety level information.

Here, the navigation device further comprises a storing unit for storing the content which is received while the moving object is moving, and that the control unit can control the navigation device such that the stored content is output when the moving object is stopped.

Also, the method of controlling an output of content of the navigation device according to an embodiment of the present invention comprises: receiving content via a network; identifying at least one of a current moving speed and a position of the moving object; determining safety level information about an output of content based on the at least one of the moving speed and the position of the moving object; and controlling the output of the received content according to the safety level information.

Here, the step of determining safety level information can include: identifying place information which is matched with the identified position of the moving object, when it is identified that the moving object is stopped; and predicting a stop period of the moving object according to the place information.

Here, in the step of determining safety level information, the safety level information can be determined based on the predicted stop period.

Here, the step of prediction a stop period can predict the stop period of the moving object according to the kind of the place information.

Here, the received content includes video content and audio content, and the step of controlling the output of the received content can be performed such that the output of the received content is blocked, when the moving object is moving.

Here, in the step of controlling the output of the received content, either the video content or the audio content can be outputted according to the safety level information.

Here, the method of controlling the output of the navigation device can further comprises a step of storing the content which is received while the moving object is moving, and in the step of controlling the output of the content, the stored content can be controlled to be outputted when the moving object is stopped.

According to the present invention described in the above, there are provided a navigation device which measures the safety level for the output of the content according to the moving speed and the position of the moving object and automatically controls a content output functionality for outputting the content, which is received from outside, via a display and a speaker according to the measured safety level as well as a method of controlling the output of the content for the navigation device.

DETAILED DESCRIPTION OF THE INVENTION

Figure 1:
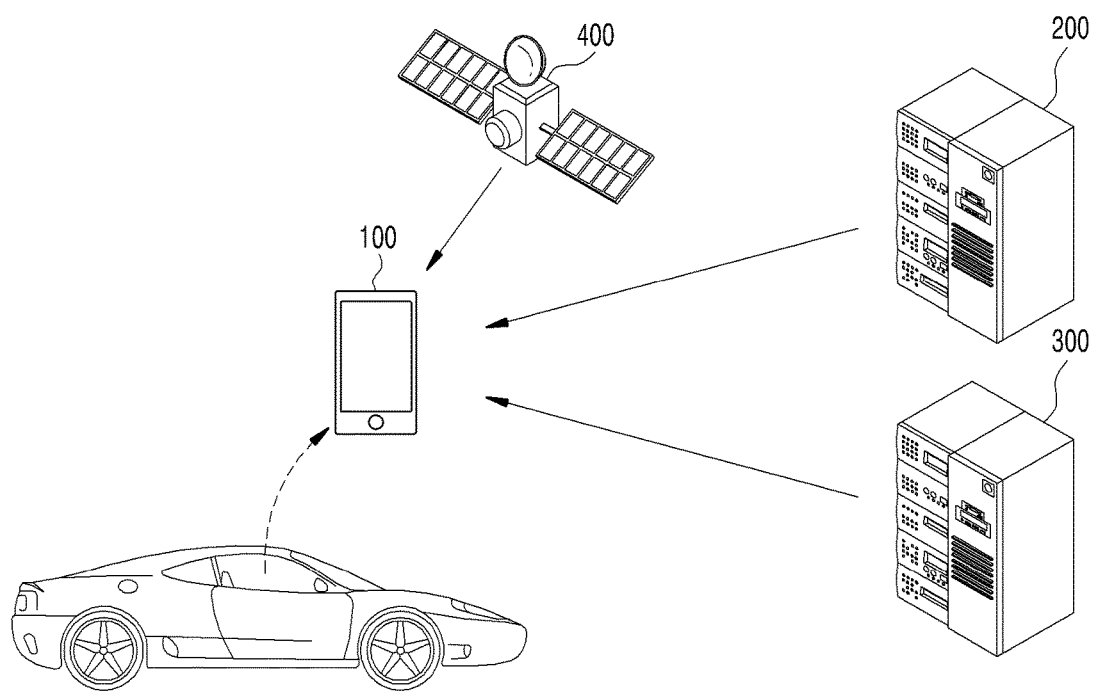
FIG. 1 schematically shows a navigation service system according to an embodiment of the present invention.

Technical terms used herein are used merely for illustrating specific embodiments, and it is to be noted that they are not intended to limit technical spirit disclosed in this specification. Also, the technical terms used herein are to be construed by the meanings normally accepted by the person having ordinary skill in the relevant art, unless specifically defined by other meanings in this specification, and it is neither to be construed by excessively comprehensive meanings nor excessively narrow meanings. Also, when the technical terms used herein are determined to be wrong technical terms which fail to represent the technical spirit disclosed in this specification correctly, the terms are to be replaced by the technical terms which can be accurately understood by the person having ordinary skill in the art. Also, the general terms used in this specification are to be construed as defined in the dictionaries or according to context, and they are not to be construed in an excessively narrow meaning.

Also, the singular representation used in this specification includes plural representations unless it is clearly expressed in the context to the contrary. The terms "include" or "is composed of" in this specification are not to be construed to necessarily include all components and all steps cited in this specification, and it should be construed to exclude some components or some steps or further include additional components and steps.

Also, the terms representing an ordinal number such as first, second, etc. used in this specification can be used to explain various components, however, the components are not to be limited by these terms. These terms are used only for discriminate one component from other components. For example, the first component can be entitled as a second component, and similarly, the second component can be entitled as the first component, without departing from the technical scope of the present invention.

In the following, embodiments disclosed in this specification are to be described in detail by referring to the appended figures, wherein the same reference numerals are given to the same or like components irrespective of the number of the figures, and duplicate description on them will be omitted.

Also, when it is determined that a detailed description on a relevant known art will obscure the subject matter disclosed in the specification while describing the technologies disclosed in this specification, the detailed description will be omitted. Also, it is to be noted that the appended figures are only for facilitating the technical spirit disclosed in this specification and the technical spirit are not to be construed to be limited by the appended figures.

Hereinafter, the present invention will be described in detail by referring to appended drawings.

FIG. 1 schematically shows a navigation service system according to an embodiment of the present invention.

As shown in the figure, a navigation service system includes a navigation device 100, a content server 200, and a navigation server 300.

The navigation device 100 can receive a global positioning system (GPS) signal from a GPS satellite 400 to identify its position information and can identify a fine position by analyzing the GPS signals which are received from a plurality of GPS satellites 400.

The navigation device 100 can be implemented as stand-alone hardware attached to a moving object such as a vehicle, etc., and can also be implemented as an application which is installed on a portable terminal such as a tablet personal computer (PC) to perform a navigation functionality. In this case, the portable terminal can be implemented as a device which can access the content server 200 and the navigation server 300 through a GPS reception functionality and via a mobile communication network (long term evolution (LTE), wideband code division multiple access (WCDMA), Wimax, etc.) or a wireless LAN (Wi-Fi) to transmit and receive data to and from the content server 200 and the navigation server 300.

The navigation server 300 can be connected to the navigation device 100 via a network and provides additional information related to position information and path information such as real time traffic information, etc. which is provided from the navigation device 100.

According to the present invention, the navigation device 100 predicts a stop period, when the moving object is stopped, according to the current position as described in the following, and it can provide a prediction result of the stop period which is determined according to the kind of adjacent places such as a crossroad, a gas station, a parking lot, etc. as the additional information to the navigation device 100. In the meantime, the additional information can be incorporated on a map as coordinates of respective places to be provided to the navigation device 100. Also, functionalities which are related to an installation of the application such as downloading and updating, etc. of the application can be provided.

The content server 200 performs the functionality of providing the content to the navigation device 100 via the network, and can, for example, send the content to the navigation application according to a push method.

The content can, for example, have various types such as advertisement and news, etc., and it can include video content and audio content. Here, the video and audio content can be provided in a digital data format pursuant to various known file formats or compression types, or can be divided into video and audio to be outputted from the navigation device 100.

The content server 200 can transmit the content to the navigation device 100 in various time instants according to different embodiments.

For example, the content, which is set as default content, can be transmitted at a constant time interval, when the navigation application is turned ON/OFF, or when the moving object is stopped, or the content (such as advertisement content of nearby stores), which corresponds to a specific position, can be transmitted when the navigation device 100 arrives at the corresponding position.

According to the present invention, even when the content is received from the content server 200, the navigation device 100 can control the output of the content by considering a current safety level.

The navigation device is mostly used while a vehicle is moving, and it can be dangerous to expose these types of content to users while driving. Therefore, the navigation device 100 can determine the safety level by considering a current moving speed and a position and then output the video content or audio content according to the determined safety level.

In the following, the configuration of the navigation device 100 will be explained in more detailed while focusing on a content output control technique which can be regarded as a subject matter of the present invention.

Figure 2:
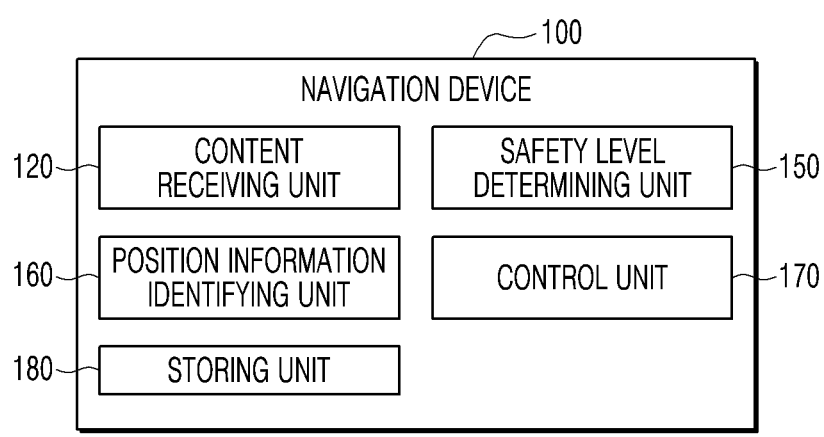
FIG. 2 is a block diagram of a navigation device according to an embodiment of the present invention.

FIG. 2 is a block diagram of the navigation device 100 according to an embodiment of the present invention.

As shown in the figure, the navigation device 100 includes a position information identifying unit 160, a safety level determining unit 150, a content receiving unit 120, a storing unit 180, and a content output control unit 170, however, the spirit of the present invention can be practiced even when some of the components are omitted or replaced with other parts.

The navigation device 100 can be implemented as a known portable terminal such as a smart phone and a tablet PC which can perform a wireless communication functionality, a content output functionality and include the navigation application installed and executed thereon; however detailed embodiments are not limited to them.

In the following, it is assumed that the navigation device 100 is installed and operated on a moving object such as a vehicle, etc. throughout the description of the present invention.

Fundamentally, the navigation device 100 according to the present invention supports a navigation functionality.

That is, the navigation device 100 can receive position and path information as well as related additional information from the navigation server 300, and can output the information related to the navigation (such as a map, path information, peripheral information etc.) in visible and audible formats based on the received additional information.

The content receiving unit 120 receives the content via the network.

That is, the content receiving unit 120 can receive the content from the content server 200 via the network. The content can be received on the navigation application in a push method and the content can include, for example, various types of advertisement and news.

The received content includes the video content and the audio content and can be provided in a digital data format pursuant to various known file formats or compression types, or can be divided into video and audio to be outputted from the navigation device 100.

The control unit 170 controls the overall operation of the navigation device 100 according to the present invention and can include a system on chip (SOC) application processor (AP) and storage devices such as a flash memory, etc.

In particular, the control unit 170 performs an output control on the content according to the spirit of the present invention, and the output control is performed according to the determined safety level information and will be explained in detail in the following.

The position information identifying unit 160 identifies the current moving speed and the position of the moving object.

When the GPS signals which are transmitted from the GPS satellites 400 are received, the position information identifying unit 160 can determine current position coordinates according to the GPS signals which are received from the GPS satellites 400, and can identify an acceleration of the moving object by using an acceleration sensor (not shown) which senses the acceleration of the moving object. The position of the moving object is extracted from the map as coordinates, and it can be determined whether the moving object is currently moving or stopped according to a determined moving speed.

The safety level determining unit 150 determines safety level information for the output of the content based on the position information which is identified by the position information identifying unit 160.

Here, the safety level information represents the possibility of a negligent accident during a maneuver of the moving object at the time of outputting the content, and the safety level information can be used as a criterion for determining whether the content is to be output or the type of the output of the content.

The safety level information can be classified into a plurality of grades, and an example having three grades such as high, middle, and low from the highest safety level will be explained in the following.

The safety level determining unit 150 can determine that the safety level is low when the moving object is moving or when the moving object is moving at a speed higher than or equal to a predetermined speed (for example, 20 km/h).

In this case, the control unit 170 can block the output of the content even when the content is received via the content receiving unit 120. Also, the control unit 170 stores the blocked content on the storing unit 180, and, when the moving object is stopped, re-determines whether the content is to be output and deletes the outputted content from the storing unit 180.

When it is identified that the moving object is stopped, the safety level determining unit 150 identifies place information which is matched with the identified position of the moving object.

As described in the above, the position of the moving object can be extracted on the map as coordinates and displayed. Also, map information of the navigation application can be stored to be matched with places (a crossroad, a highway, a gas station, a parking lot, etc.) which are located at respective coordinates. Therefore, the safety level determining unit 150 can search for the place at the position coordinates which are matched with (or adjacent to) the identified position coordinates of the moving object, and then determine that the moving object is stopped at the corresponding place.

Figure 3:
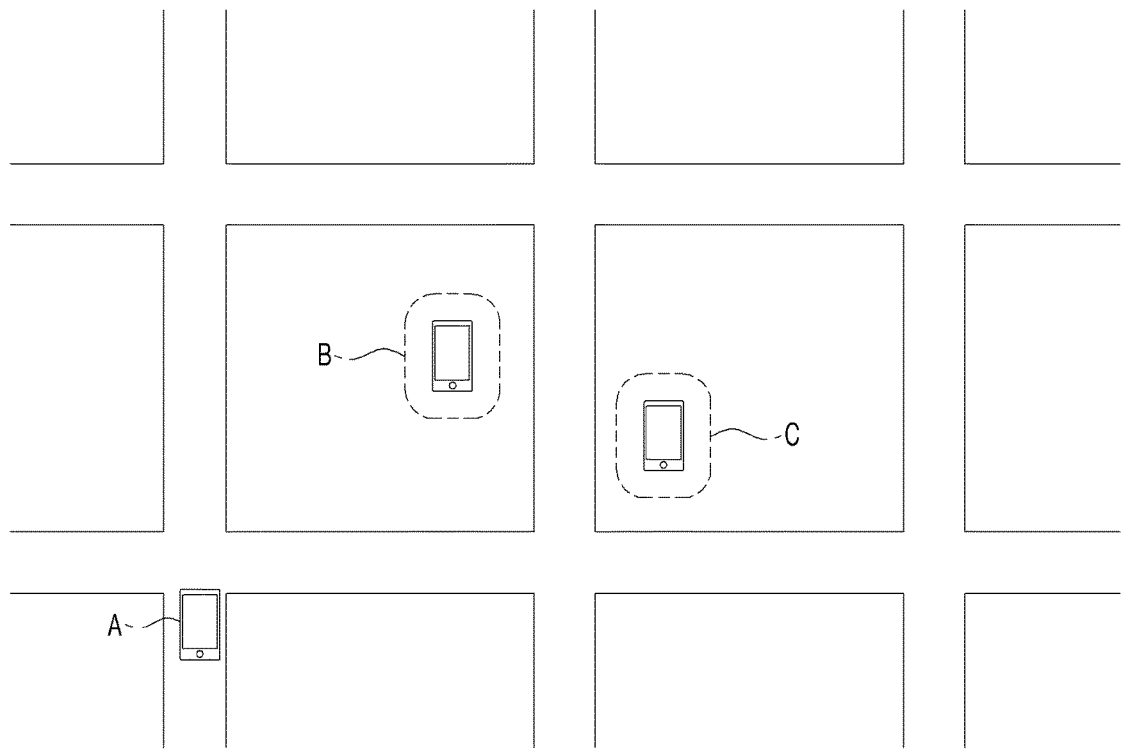
FIG. 3 illustrates an embodiment which determines safety level grades based on places adjacent to a current position according to an embodiment of the present invention.

By referring to FIG. 3, when the position coordinates of the moving object correspond to position A, it can be identified that the current place is on the crossroad; when they correspond to position B, it can be identified that the current place is on the parking lot; and it can be identified that position C corresponds to the gas station.

When the place information of the moving object is identified, the safety level determining unit 150 can predict the stop period of the moving object after the moving object is stopped.

For example, when the moving object is at the crossroad in FIG. 3, it can be estimated that the moving object is stopped for a next signal, and the stop period will be short. In this case, it can be dangerous to output the video content on the navigation device 100 or manipulate a graphical user interface (GUI) which is related to the content.

Therefore, when the current place information of the moving object corresponds to the crossroad, the safety level determining unit 150 determines that the safety level is middle.

In this case, in order not to distract a user's attention by outputting the video content, the control unit 170 can control the navigation device such that the navigation device extracts only the audio content and then output the extracted audio content in a sound format.

In addition, the audio content also can distract the attention of the user when it is exposed too often, so an output period of the audio content can be controlled such that the audio content is output at intervals longer than a predetermined time interval.

Meanwhile, when the position coordinates of the moving object correspond to the position B or the position C in FIG. 3, that is, when the position coordinates correspond to the parking lot or the gas station, the moving object is normally stopped for a longer time, and, therefore, the stop period of the moving object can be predicted to be somewhat longer.

In this case, the possibility of a dangerous situation is low even when the user watches a screen or manipulates the GUI, and therefore the safety level determining unit 150 determines that the safety level is high and the control unit 170 can control the navigation device to output the video content and the audio content in a display format and a sound format, respectively.

In the meantime, the navigation device 100 normally tends to have a music play application installed thereon, and the user can listen to the music by using the navigation device 100 while driving.

In this case, since the user can be distracted from the music when the audio content such as advertisement, etc. is exposed too often, it is preferable that the control unit 170 determines whether the music play application is playing music, and, when so, the control unit 170 prevents the audio content from being output.

As explained in detail above, the safety level determining unit 150 identifies the place of the moving object by using its current position, and determines the safety level grade according to the corresponding place. In order to accomplish this, places and kinds of the corresponding places can be stored to be matched with the respective coordinates on the map of the navigation device 100. Here, the kinds of the places mean general categories of the place such as a crossroad, a highway, a gas station, a parking lot, etc., and information on predicted stop period can be additionally matched with the respective places and stored.

Meanwhile, the information such as the kinds of the respective places of the position coordinates, the predicted stop period, etc., can be included in the additional information which is received from the navigation server 300.

In order to accomplish this, the navigation server 300 can collect the stop periods for respective position coordinates during which the moving object is stopped, from various navigation devices 100. That is, the stop periods of the moving object for the respective position coordinates are collected to be stored in a database (DB), a predicted stop period for the current position coordinates is sent as the additional information, and the safety level determining unit 150 of the navigation device 100 can determine the safety level based on the additional information which is received from the navigation server 300.

According to the present invention explained in the above, the navigation device 100 can determine the safety level for the content, which is received from the content server 200, by considering the current position information and the moving speed, and control the output of the content in either one of 'output all', 'output audio only', and 'block all output', etc., such that the navigation device 100 can minimize the danger due to watching of the content during a maneuver while maximizing the exposure frequency of the content.

Meanwhile, it is to be noted that the components of the navigation device 100 can be implemented as a software module or a hardware module which is executed by a processor, or as a combination of the software module and the hardware module.

Likewise, the software module, the hardware module, or the combination of the software module and the hardware module can be implemented as a hardware system (for example, a computer system).

Therefore, the hardware system for implementing the navigation device 100 according to an embodiment of the present invention will be described in the following. It is to be noted that the description herein is a mere example for implementing the components in the aforementioned navigation device 100 explained related to the computer system, and that it is possible that the operations thereof can be different from an actual system.

Figure 4:
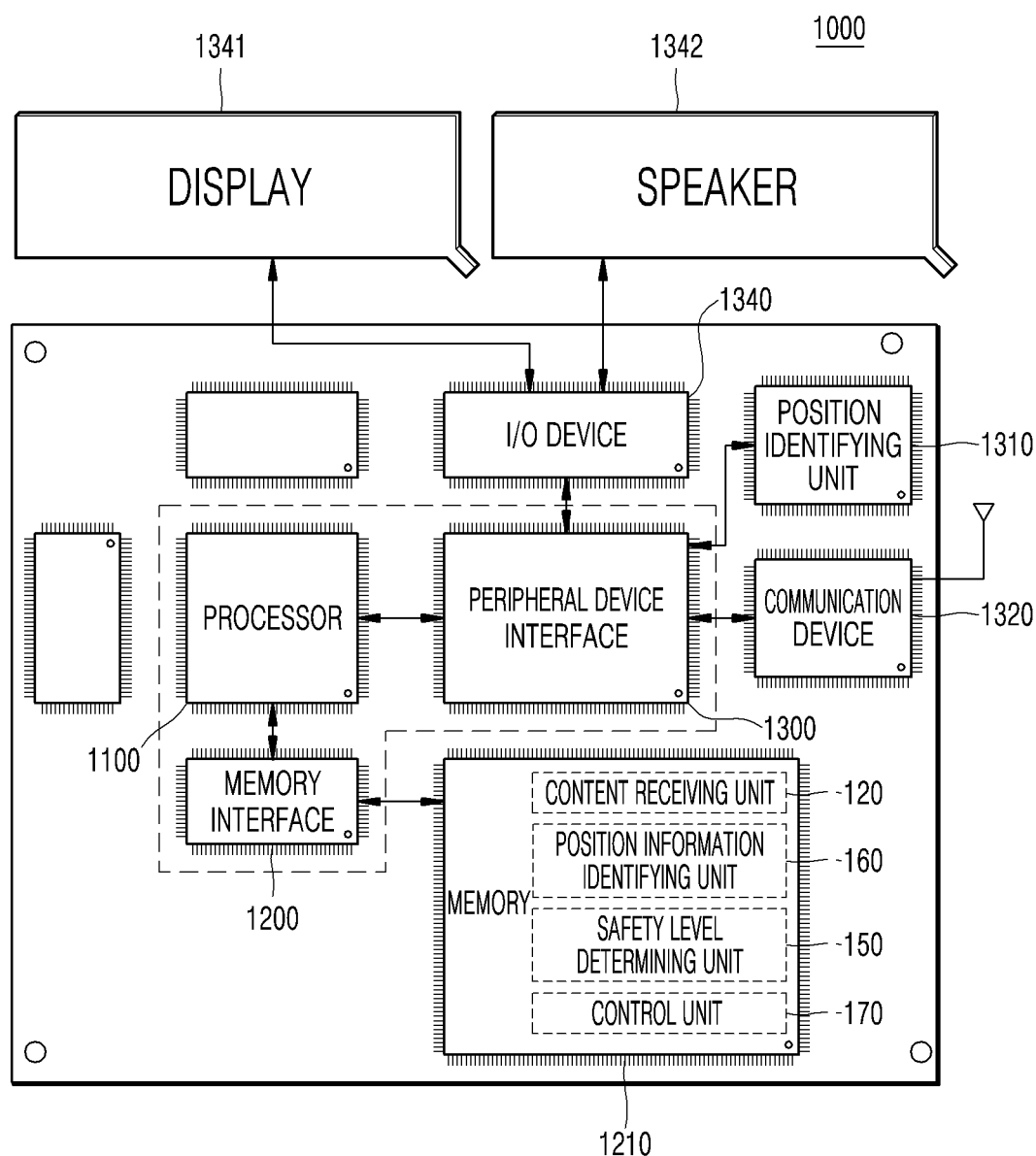
FIG. 4 is a schematic configuration of a hardware system according to an embodiment of the present invention.

FIG. 4 is a diagram showing a configuration of a hardware service system for implementing the navigation device 100 according to an embodiment of the present invention.

As shown in FIG. 4, the hardware system 1000 according to an embodiment of the present invention can have a configuration including a processor 1100, a memory interface 1200, and a peripheral interface 1300.

These inner components of the hardware system 1000 can be separate components or integrated in at least one integrated circuit, and these components can be coupled with a bus system (not shown).

Here, the bus system is the abstraction representing adequate bridges, adapters, and/or arbitrary one or more separate physical bus connected via a controller, communication lines/interfaces, and/or multi-drop or point-to-point connections.

The processor 1100 can execute various software modules included in a memory 1210 by communicating with the memory 1210 via the memory interface 1200 to enable the hardware system to perform various functions.

Here, the position information identifying unit 160, the safety level determining unit 150, the content receiving unit 120 and the content output control unit 170, which are described as main components of the navigation device 100 explained by referring to FIG. 2, can be stored as software modules in the memory 1210, and an operation system can be additionally stored in the memory.

As for the operation system (for example, iOS, Android, Darwin, RTXC, LINUX, UNIX, OS X, WINDOWS, or an embedded operation system such as VxWorks) includes various procedures, command sets, software components and/or drivers which control and manage normal system tasks (for example, memory management, storage device control, power management, etc.), and serves to facilitate the communication among various hardware modules and software modules.

For reference, the memory 1210 can include a memory hierarchical structure including but not limited to a cache, a main memory, and a secondary memory, and the memory hierarchical structure can be implemented through an arbitrary combination of a random access memory (RAM) (for example, a static random access memory (SRAM), a dynamic random access memory (DRAM), a display dynamic random access memory (DDRAM)), a read only memory (ROM), a FLASH memory, a magnetic and/or optical storage device (for example, a disk drive, a magnetic tape, a compact disk (CD) and a digital video disc (DVD), etc.).

The peripheral device interface 1300 serves to facilitate the communication between the processor 1100 and peripheral devices.

As for the peripheral device, it is for providing different functionalities to the computer system and can include, for example, a position identifying device 1310, a communication device 1320, and an input/output device 1340 according to an embodiment of the present invention.

Here, the position identifying device 1310 refer to, for example, a position sensor, a global positioning system (GPS) for providing different position data such as latitude, longitude, and altitude can be applied to the position identifying device, and, in this case, the position identifying device can include a GPS module (not shown).

Also, the position identifying device 1310 can include an acceleration sensor (not shown) and sense the acceleration of the moving object.

Also the communication device 1320 serves to provide the communication functionality with other devices, includes but is not limited to, for example, an antenna system, a radio frequency (RF) transceiver, at least one amplifier, a tuner, at least one oscillator, a digital signal processor, a CODEC chipset, a memory, etc., and can include a known circuitry for performing these functionalities.

The communication protocol which is supported by the communication device 1320 includes, for example, long term evolution (LTE), time division multiple access (TDMA), code division multiple access (CDMA), global system for mobile communications (GSM), enhanced data GSM environment (EDGE), wideband code division multiple access (W-CDMA), Wi-Fi (IEEE 802.11a, IEEE 802.11b, IEEE 802.11g and/or IEEE 802.11n, etc.), Bluetooth, Wi-MAX, voice over Internet protocol (VoIP), and protocols for email, instant messaging, and a short message service (SMS), and protocols, which are not limited to these and provide a communication environment with other devices, can also be included in the communication protocol.

In addition, the I/O device 1340 serves as a controller for controlling an I/O device linked with the other hardware systems, and, according to the present invention, the I/O device can control a display 1341 for outputting (displaying) display-type navigation-related information (such as, a map, path information, and peripheral information, etc.) and the video content, and can control a speaker 1342 for outputting the audio content.

As a result, the inner components of the navigation device 100 which are stored as software modules in the memory 1210, communicate with the position identifying device 1310 and the communication device 1320 by way of the memory interface 1200 and the peripheral device interface 1300, when executed by the processor 1100, such that the exposure frequency of the content is maximized in the hardware system 1000 while minimizing the danger due to watching of the content while driving.

In the following, inner components of the hardware system 1000, which controls the output of the content, are explained in detail by referring to FIG. 4, and it is assumed to explain in a more convenient way that the inner components of the navigation device 100, which are stored in the memory 1210 as software modules, have been executed by the processor 1100 by way of the memory interface 1200.

The content receiving unit 120 serves to receive the content from the content server 200 via the communication device 1320.

More specifically, the content receiving unit 120 receives the content, which is received in a push method from the content server 200 to the navigation application, and examples of the content include various types of advertisements and news.

The received content includes the video content and the audio content and can be provided in a digital data format pursuant to various known file formats or compression types, or can be divided into video and audio to be outputted from the navigation device 100.

As a result, by driving the communication device 1320 in the hardware system 1000 by way of the memory interface 1200 and the peripheral device interface 1300, the content receiving unit 120 can receive various types of video content and audio content such as advertisement, news, etc. from the content server 200.

The position information identifying unit 160 serves to identify the current moving speed and the position of the moving object on which the navigation device 100 is attached or mounted.

That is, the position information identifying unit 160 identifies the current moving speed and the position of the moving object by using the position identifying device 1310.

More specifically, when the GPS signals, which are transmitted by the GPS satellites 400, are received, the position information identifying unit 160 can identify the current position based on the current position coordinates according to the GPS signals which are received from the respective GPS satellites 400. The position of the moving object is extracted from the map as coordinates, and it can be determined whether the moving object is currently moving or stopped according to a determined moving speed.

Also, the position information identifying unit 160 can identify the sensed acceleration of the moving object by using the position identifying device 1310.

As a result, by driving the position identifying device 1310 in the hardware system 1000 by using the memory interface 1200 and the peripheral interface 1300, the position information identifying unit 160 can identify the current moving speed and the position of the moving object.

The safety level determining unit 150 serves to determine safety level information for the output of the content based on the position information which is identified by the position information identifying unit 160.

Here, the safety level information represents the possibility of a negligent accident during a maneuver of the moving object at the time of outputting the content, and the safety level information can be used as a criterion for determining whether the content is to be output or the type of the output of the content.

The safety level information can be classified into a plurality of grades, and an example having three grades such as high, middle, and low from the highest safety level will be explained in the following.

The control unit 170 serves to control the output of the content by using the I/O device 1340 according to the safety level information which is identified by the safety level determining unit 150.

That is, the control unit 170 can control the output of the content through the display 1341 and the speaker 1342 by driving the, I/O device 1340 in the hardware system 1000 using the memory interface 1200 and the peripheral device interface 1300.

The procedure in which the control unit 170 controls the output of the content will be explained in more detail as follows.

The safety level determining unit 150 can determine that the safety level is low when the moving object is moving or when the moving object is moving at a speed higher than or equal to a predetermined speed (for example, 20 km/h).

In this case, the control unit 170 can block the output of the content even when the content is received via the content receiving unit 120. Also, the control unit 170 stores the blocked content on the storing unit 180, and, when the moving object is stopped, re-determines whether the content is to be output and deletes the outputted content from the storing unit 180.

When it is identified that the moving object is stopped, the safety level determining unit 150 identifies place information which is matched with the identified position of the moving object.

As described in the above, the position of the moving object can be extracted on the map as coordinates and displayed. Also, map information of the navigation application can be stored to be matched with places (a crossroad, a highway, a gas station, a parking lot, etc.) which are located at respective coordinates. Therefore, the safety level determining unit 150 can search for the place at the position coordinates which are matched with (or adjacent to) the identified position coordinates of the moving object, and then determine that the moving object is stopped at the corresponding place.

By referring to FIG. 3, when the position coordinates of the moving object correspond to position A, it can be identified that the current place is on the crossroad; when they correspond to position B, it can be identified that the current place is on the parking lot; and it can be identified that position C corresponds to the gas station.

When the place information of the moving object is identified, the safety level determining unit 150 can predict the stop period of the moving object after the moving object is stopped.

For example, when the moving object is at the crossroad in FIG. 3, it can be estimated that the moving object is stopped for a next signal, and the stop period will be short. In this case, it can be dangerous to output the video content on the navigation device 100 or manipulate a graphical user interface (GUI) which is related to the content.

Therefore, when the current place information of the moving object corresponds to the crossroad, the safety level determining unit 150 determines that the safety level is middle.

In this case, in order not to distract the attention of the user by outputting the video content, the control unit 170 can drive the I/O device 1340 in the hardware system 1000 by using the peripheral device interface 1300 such that only the audio content is output through the speaker 1342.

In addition, the audio content also can distract the attention of the user when it is exposed too often, so an output period of the audio content can be controlled such that the audio content is output at intervals longer than a predetermined time interval.

Meanwhile, when the position coordinates of the moving object correspond to the position B or the position C in FIG. 3, that is, when the position coordinates correspond to the parking lot or the gas station, the moving object is normally stopped for a longer time, and, therefore, the stop period of the moving object can be predicted to be somewhat longer.

In this case, the possibility of a dangerous situation is low even when the user watches a screen or manipulates the GUI, and therefore the safety level determining unit 150 determines that the safety level is high.

In this case, the control unit 170 can drive the I/O device 1340 in the hardware system 1000 by using the peripheral device interface 1300, such that the video content is output through the display 1341 and the audio content is output through the speaker 1342.

In the meantime, the navigation device 100 normally tends to have a music play application installed thereon, and the user can listen to the music by using the navigation device 100 while driving.

In this case, since the user can be distracted from the music when the audio content such as advertisement, etc. is exposed too often, it is preferable that the control unit 170 determines whether the music play application is playing music, and, when so, the control unit 170 prevents the audio content from being output.

As explained in detail above, the safety level determining unit 150 identifies the place of the moving object by using its current position, and determines the safety level grade according to the corresponding place. In order to accomplish this, places and kinds of the corresponding places can be stored to be matched with the respective coordinates on the map of the navigation device 100. Here, the kinds of the places mean general categories of the place such as a crossroad, a highway, a gas station, a parking lot, etc., and information on predicted stop period can be additionally matched with the respective places and stored.

Meanwhile, the information such as the kinds of the respective places of the position coordinates, the predicted stop period, etc., can be included in the additional information which is received from the navigation server 300.

In order to accomplish this, the navigation server 300 can collect the stop periods for respective position coordinates during which the moving object is stopped, from various navigation devices 100. That is, the stop periods of the moving object for the respective position coordinates are collected to be stored in a database (DB), a predicted stop period for the current position coordinates is sent as the additional information, and the safety level determining unit 150 of the navigation device 100 can determine the safety level based on the additional information which is received from the navigation server 300.

According to the present invention explained in the above, the navigation device 100 can determine the safety level for the content, which is received from the content server 200, by considering the current position information and the moving speed, and control the output of the content in either one of 'output all', 'output audio only', and 'block all output', etc., such that the navigation device 100 can minimize the danger due to watching of the content during a maneuver while maximizing the exposure frequency of the content.

Figure 5:
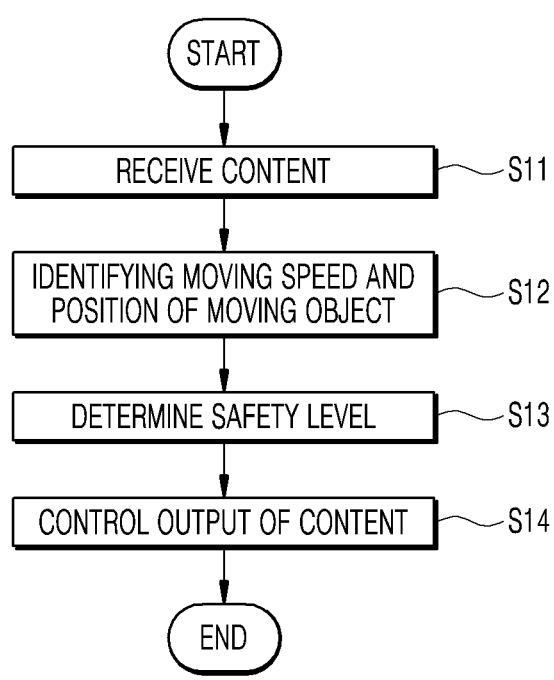
FIG. 5 is a flow chart of a content output control method for the navigation device according to an embodiment of the present invention.

FIG. 5 is a flow chart of a content output control method for the navigation device according to an embodiment of the present invention.

The shown method can be performed by the navigation device which is described by referring to FIGS. 1-4 where corresponding reference numbers are used for convenience of explanation and redundant explanations on described technical features are omitted.

The navigation device 100 can be implemented as a known portable terminal such as a smart phone and a tablet PC which can perform a wireless communication functionality, a content output functionality and include the navigation application installed and executed thereon.

The navigation device 100 receives content from the content server 200 (S11).

In the meantime, the content can be received on the navigation application in a push method and the content can include, for example, various types of advertisement and news. The content server 200 can transmit the content, which is set as default content, at a constant time interval, when the navigation application is turned ON/OFF, or when the moving object is stopped, or the content (such as advertisement content of nearby stores), which corresponds to a specific position, can be transmitted when the navigation device 100 arrives at the corresponding position.

The navigation device 100 identifies the moving speed and the position of the moving object (S12).

In order to accomplish this, the navigation device 100 can include a GPS module, which receives the GPS signals transmitted by the GPS satellites and determines the current position coordinates according to the GPS signals received from the respective GPS satellites, as well as an acceleration sensor which can determine the acceleration of the moving object.

When the moving speed and the position are identified, the navigation device 100 determines the safety level information (S13).

Here, the safety level information represents the possibility of a negligent accident during a maneuver of the moving object at the time of outputting the content, and the safety level information can be used as a criterion for determining whether the content is to be output or the type of the output of the content. Also, the safety level information can be classified into a plurality of grades, can also be divided into high, middle, and low grades from the highest safety level.

Also, the navigation device 100 can identify the place information which is matched with the identified position of the moving object, when it is identified that the moving object is stopped, and predict a stop period of the moving object according to the place information.

As described above by referring to FIG. 3, when the position coordinates of the moving object are on a crossroad, the stop period can be predicted to be short, while it can be predicted to be long when the position coordinates of the moving object are on a gas station or a parking lot.

From this point of view, the navigation device 100 can determine the grades for the safety level (for example, high/middle/low) according to the place information and the predicted stop period therefor.

Also, the navigation device 100 can store the places and kinds of the corresponding places to be matched with the respective coordinates on the map.

Here, the kinds of the places mean general categories of the place such as a crossroad, a highway, a gas station, a parking lot, etc., and information on predicted stop period can be additionally matched with the respective places and stored.

Also, the information such as the kinds of the respective places of the position coordinates, the predicted stop period, etc., can be included in the additional information which is received from the navigation server 200.

In order to accomplish this, the navigation server 200 can collect the stop periods for respective position coordinates during which the moving object is stopped, from various navigation devices 100. That is, the stop periods of the moving object for the respective position coordinates are collected to be stored in a database (DB), a predicted stop period for the current position coordinates is sent as the additional information, and the navigation device 100 can determine the safety level based on the additional information which is received from the navigation server 300.

When the safety level information is determined, the navigation device 100 can control the output of the received content according to the safety level information (S14).

In the meantime, the navigation device 100 can block the output of the content, output the audio content only, or output the audio content along with the video content according to the safety level information.

At first, when the moving object is moving or when the moving object is moving at a speed higher than or equal to a predetermined speed (for example, 20 km/h), the safety level can be determined to be low, and the navigation device 100 can block the output of the received content without outputting it.

Also, the navigation device 100 stores the blocked content on the storing unit, and, when the moving object is stopped, re-determines whether the content is to be output, and deletes the outputted content from the storing unit 180.

Also, when the position of the moving object corresponds to the place such as a crossroad for which the predicted stop period is estimated to be short, the navigation device 100 can determine that the safety level is middle, and output the audio content only.

Also, when the position of the moving object corresponds to the place such as a gas station or a parking lot for which the predicted stop period is estimated to be long, the navigation device 100 can determine that the safety level is high, and output both the video content as well as the audio content.

According to the present invention explained in the above, there can be provided the navigation device 100 and a content output control method therefor which can determine the safety level for the content, which is received from the content server 200, by considering the current position information and the moving speed, and control the output of the content in either one of 'output all', 'output audio only', and 'block all output', etc., such that the navigation device 100 can minimize the danger due to watching of the content during a maneuver while maximizing the exposure frequency of the content.

Figure 6:
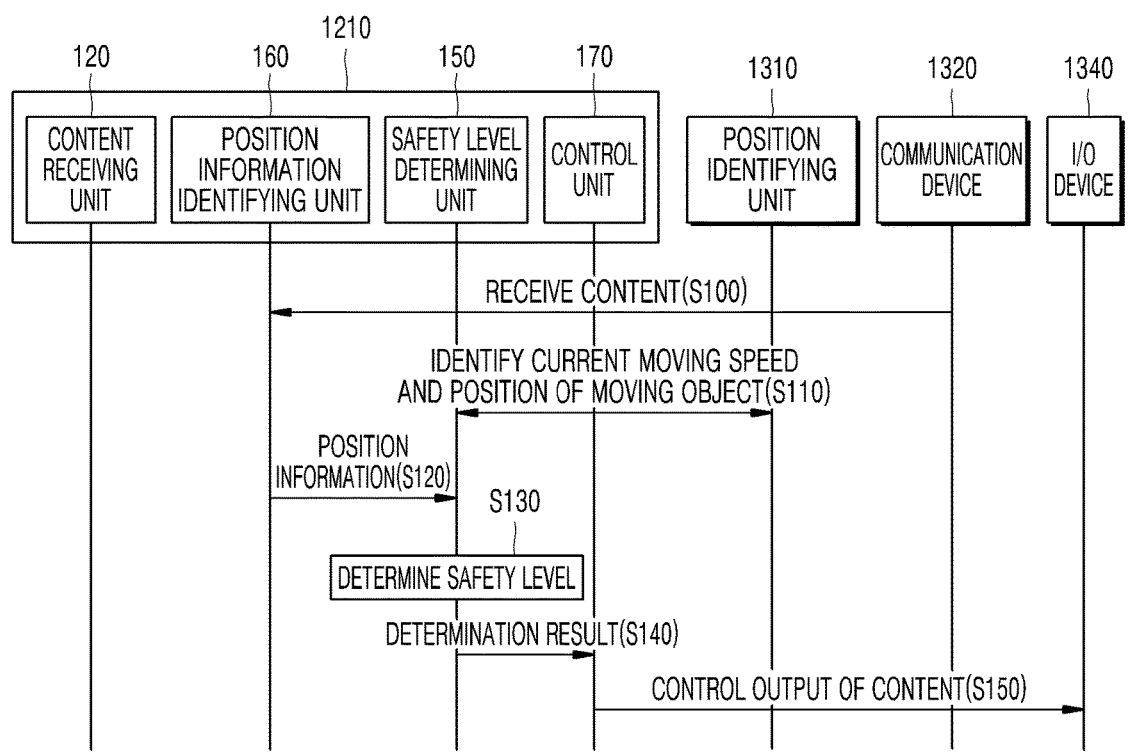
FIG. 6 is a sequential diagram for describing an operation flow of the hardware system according to an embodiment of the present invention.

In the following, the operation flow of respective components in the hardware system 1000, which performs the content output control according to an embodiment of the present invention, will be explained in detail by referring to FIG. 6.

It is assumed to explain in a more convenient way that the inner components of the navigation device 100, which are stored in the memory 1210 as software modules, have been executed by the processor 1100 by way of the memory interface 1200.

At first, the content receiving unit 120 receives content from the content server 200 (S100).

That is, by using the communication device 1320 in the hardware system 1000, the content receiving unit 120 can receive various types of video content and audio content such as advertisement, news, etc. from the content server 200.

Meanwhile, the position information identifying unit 160 identifies the current moving speed and the position of the moving object on which the navigation device 100 is attached or mounted (S110).

That is, the position information identifying unit 160 in the hardware system 1000 identifies the current moving speed and the position of the moving object by using the position identifying device 1310.

More specifically, when the GPS signals, which are transmitted by the GPS satellites 400, are received, the position information identifying unit 160 can identify the current position based on the current position coordinates according to the GPS signals which are received from the respective GPS satellites 400. The position of the moving object is extracted from the map as coordinates, and it can be determined whether the moving object is currently moving or stopped according to a determined moving speed.

Also, the position information identifying unit 160 can identify the sensed acceleration of the moving object by using the position identifying device 1310.

As a result, by driving the position identifying device 1310 in the hardware system 1000 by using the memory interface 1200 and the peripheral interface 1300, the position information identifying unit 160 can identify the current moving speed and the position of the moving object.

Then, the position information identifying unit 160 notifies the position information including the identified current moving speed and the position to the safety level determining unit 150 (S120).

The safety level determining unit 150 determines safety level information for the output of the content based on the position information which is identified by the position information identifying unit 160 (S130).

Here, the safety level information represents the possibility of a negligent accident during a maneuver of the moving object at the time of outputting the content, and the safety level information can be used as a criterion for determining whether the content is to be output or the type of the output of the content.

The safety level information can be classified into a plurality of grades, and an example having three grades such as high, middle, and low from the highest safety level will be explained in the following.

And, the safety level determining unit 150 notifies the determination result to the control unit 170 (S140).

The control unit 170 controls the output of the content by using the I/O device 1340 according to the safety level information which is identified by the safety level determining unit 150 (S150).

That is, the control unit 170 can control the output of the content through the display 1341 and the speaker 1342 by driving the, I/O device 1340 in the hardware system 1000 using the memory interface 1200 and the peripheral device interface 1300.

The procedure (S130-S150) in which the output of the content is controlled will be explained in more detail as follows.

The safety level determining unit 150 can determine that the safety level is low when the moving object is moving or when the moving object is moving at a speed higher than or equal to a predetermined speed (for example, 20 km/h).

In this case, the control unit 170 can block the output of the content even when the content is received via the content receiving unit 120. Also, the control unit 170 stores the blocked content on the storing unit 180, and, when the moving object is stopped, re-determines whether the content is to be output and deletes the outputted content from the storing unit 180.

When it is identified that the moving object is stopped, the safety level determining unit 150 identifies place information which is matched with the identified position of the moving object.

As described in the above, the position of the moving object can be extracted on the map as coordinates and displayed. Also, map information of the navigation application can be stored to be matched with places (a crossroad, a highway, a gas station, a parking lot, etc.) which are located at respective coordinates. Therefore, the safety level determining unit 150 can search for the place at the position coordinates which are matched with (or adjacent to) the identified position coordinates of the moving object, and then determine that the moving object is stopped at the corresponding place.

By referring to FIG. 3, when the position coordinates of the moving object correspond to position A, it can be identified that the current place is on the crossroad; when they correspond to position B, it can be identified that the current place is on the parking lot; and it can be identified that position C corresponds to the gas station.

When the place information of the moving object is identified, the safety level determining unit 150 can predict the stop period of the moving object after the moving object is stopped.

For example, when the moving object is at the crossroad in FIG. 3, it can be estimated that the moving object is stopped for a next signal, and the stop period will be short. In this case, it can be dangerous to output the video content on the navigation device 100 or manipulate a graphical user interface (GUI) which is related to the content.

Therefore, when the current place information of the moving object corresponds to the crossroad, the safety level determining unit 150 determines that the safety level is middle.

In this case, in order not to distract the attention of the user by outputting the video content, the control unit 170 can drive the I/O device 1340 in the hardware system 1000 by using the peripheral device interface 1300 such that only the audio content is output through the speaker 1342.

In addition, the audio content also can distract the attention of the user when it is exposed too often, so an output period of the audio content can be controlled such that the audio content is output at intervals longer than a predetermined time interval.

Meanwhile, when the position coordinates of the moving object correspond to the position B or the position C in FIG. 3, that is, when the position coordinates correspond to the parking lot or the gas station, the moving object is normally stopped for a longer time, and, therefore, the stop period of the moving object can be predicted to be somewhat longer.

In this case, the possibility of a dangerous situation is low even when the user watches a screen or manipulates the GUI, and therefore the safety level determining unit 150 determines that the safety level is high.

In this case, the control unit 170 can drive the I/O device 1340 in the hardware system 1000 by using the peripheral device interface 1300, such that the video content is output through the display 1341 and the audio content is output through the speaker 1342.

In the meantime, the navigation device 100 normally tends to have a music play application installed thereon, and the user can listen to the music by using the navigation device 100 while driving.

In this case, since the user can be distracted from the music when the audio content such as advertisement, etc. is exposed too often, it is preferable that the control unit 170 determines whether the music play application is playing music, and, when so, the control unit 170 prevents the audio content from being output.

In the following, another embodiment of the present invention will be explained by referring to FIGS. 7 and 8.

Figure 7:
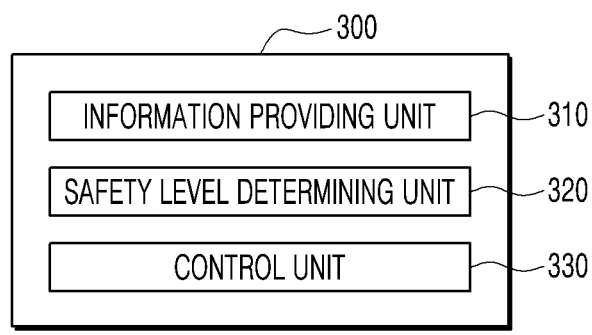
FIG. 7 is a block diagram of a navigation server according to another embodiment of the present invention.

FIG. 7 shows a navigation server for controlling the output of the content according to another embodiment of the present invention.

The navigation server 300 can be connected to the navigation device 100 via a network and provides additional information related to position information and path information such as real time traffic information, etc. which is provided from the navigation device 100.

Here, the navigation device 100 can be implemented as standalone hardware attached to the moving object such as a vehicle, etc., and can also be implemented as an application which is installed on a portable terminal such as a tablet personal computer (PC) to perform the navigation functionality. In this case, the portable terminal can be implemented as a device which can access the content server 200 and the navigation server 300 through a GPS reception functionality and via a mobile communication network (long term evolution (LTE), wideband code division multiple access (WCDMA), Wimax, etc.) or a wireless LAN (Wi-Fi) to transmit and receive data to and from the content server 200 and the navigation server 300.

Therefore, the navigation device 100 can receive position and path information as well as related additional information from the navigation server 300, and can output the information related to the navigation (such as a map, path information, peripheral information etc.) in visible and audible formats based on the received additional information.

In the following description on another embodiment of the present invention, the principal agent, which controls the output of the content, is the navigation server 300 when the navigation device 100 outputs the content which is received from the content server 200.

The configuration of the navigation server 300 according to another embodiment of the present invention will be explained in detail by referring to FIG. 7 as follows.

As shown in FIG. 7, the navigation server 300 according to another embodiment of the present invention can include an information providing unit 310, a safety level determining unit 320, and a control unit 330.

When the information related to a navigation function is requested from the navigation device 100 which is connected via the network, the information providing unit 310 can provide the additional information such as real time traffic information, etc., which is related to the position information and path information provided by the navigation device 100, for example, the navigation-related information (for example, a map, path information, peripheral information, etc.) to the navigation device 100.

Certainly, the information providing unit 310 can also provide the navigation-related information (for example, a map, path information, peripheral information, etc.) to the navigation device 100 whenever a preset period time arrives irrespective of the request from the navigation device 100.

The safety level determining unit 320 identifies the current moving speed and the position of the moving object on which the navigation device 100 is attached or mounted, based on the communication with the navigation device 100 which is connected via the network.

For example, the safety level determining unit 320 can request the current moving speed and the position of the moving object to the navigation device 100, which is connected via the network, in a periodic manner.

In this case, the navigation device 100 identifies the current moving speed and the position of the moving object according to the request from the navigation server 300, and can provide the current moving speed and the position of the moving object to the navigation server 300.

That is, when the GPS signals which are transmitted from the GPS satellites 400 are received, the navigation device 100 can determine current position coordinates according to the GPS signals which are received from the GPS satellites 400, and can identify an acceleration of the moving object by using an acceleration sensor (not shown) which senses the acceleration of the moving object. The position of the moving object is extracted from the map as coordinates, and it can be determined whether the moving object is currently moving or stopped according to a determined moving speed.

Meanwhile, the navigation device 100 identifies the current moving speed and the position of the moving object, and can provide the current moving speed and the position of the moving object to the navigation server 300, even when no request is received from the navigation server 300.

Like this, although the procedure in which the navigation device 100 provides the current moving speed and the position of the moving object to the navigation server 300 can be performed by the navigation device 100 itself without an intervention from the navigation server 300, it is assumed that the navigation server 300 requests the current moving speed and the position of the moving object to the navigation device 100 whenever the predetermined period arrives.

When the current moving speed and the position of the moving object are identified by using the navigation device 100, the safety level determining unit 320 determines the safety level information on the output of the content based on the identified position information.

Here, the safety level information represents the possibility of a negligent accident during a maneuver of the moving object at the time of outputting the content, and the safety level information can be used as a criterion for determining whether the content is to be output or the type of the output of the content.

The safety level information can be classified into a plurality of grades, and an example having three grades such as high, middle, and low from the highest safety level will be explained in the following.

The control unit 330 controls the output of the content for the navigation device 100 according to the safety level information which is identified by the safety level determining unit 320.

That is, the control unit 330 can control the output of the content for the navigation device 100 by delivering to the navigation device 100 a control signal for controlling the output of the content to the navigation device 100 according to the safety level information which is identified by the safety level determining unit 320.

The procedure in which the control unit 330 controls the output of the content to the navigation device 100 will be explained in more detail as follows.

The safety level determining unit 320 can determine that the safety level is low when the moving object is moving or when the moving object is moving at a speed higher than or equal to a predetermined speed (for example, 20 km/h).

In this case, the control unit 330 can block the output of the content on the navigation device 100 even when the navigation device 100 has received the content from the content server 200. Also, the control unit 330 controls the navigation device 100 such that the navigation device 100 stores the blocked content in an internal storage of the navigation device 100.

Then, the control unit 330 controls whether the content is to be output to the navigation device 100 after re-determining the safety level while the moving object, to which the navigation device 100 is attached or mounted, is stopped, and controls the navigation device 100 such that the navigation device 100 deletes the output content from the internal storage of the navigation device 100.

When it is identified that the moving object is stopped, the safety level determining unit 320 identifies place information which is matched with the identified position of the moving object.

As described in the above, the position of the moving object can be extracted on the map as coordinates and displayed. Also, map information can be stored to be matched with places (a crossroad, a highway, a gas station, a parking lot, etc.) which are located at respective coordinates. Therefore, the safety level determining unit 320 can search for the place at the position coordinates which are matched with (or adjacent to) the identified position coordinates of the moving object, and then determine that the moving object is stopped at the corresponding place.

By referring to FIG. 3, when the position coordinates of the moving object correspond to position A, it can be identified that the current place is on the crossroad; when they correspond to position B, it can be identified that the current place is on the parking lot; and it can be identified that position C corresponds to the gas station.

When the place information of the moving object is identified, the safety level determining unit 320 can predict the stop period of the moving object after the moving object is stopped.

For example, when the moving object is at the crossroad in FIG. 3, it can be estimated that the moving object is stopped for a next signal, and the stop period will be short. In this case, it can be dangerous to output the video content on the navigation device 100 or manipulate a graphical user interface (GUI) which is related to the content.

Therefore, when the current place information of the moving object corresponds to the crossroad, the safety level determining unit 320 determines that the safety level is middle.

In this case, in order not to distract a user's attention by outputting the video content, the control unit 330 can control the navigation device such that the navigation device extracts only the audio content and then output the extracted audio content in a sound format.

In addition, the audio content also can distract the attention of the user when it is exposed too often, so an output period of the audio content can be controlled such that the audio content is output at intervals longer than a predetermined time interval.

Meanwhile, when the position coordinates of the moving object correspond to the position B or the position C in FIG. 3, that is, when the position coordinates correspond to the parking lot or the gas station, the moving object is normally stopped for a longer time, and, therefore, the stop period of the moving object can be predicted to be somewhat longer.

In this case, the possibility of for a dangerous situation is low even when the user watches a screen or manipulates the GUI, and therefore the safety level determining unit 320 determines that the safety level is high and the control unit 330 can control the navigation device 100 to output the video content and the audio content in a display format and a sound format, respectively.

In the meantime, the navigation device 100 normally tends to have a music play application installed thereon, and the user can listen to the music by using the navigation device 100 while driving.

In this case, since the user can be distracted from the music when the audio content such as advertisement, etc. is exposed too often, it is preferable that the control unit 330 determines whether the music play application is playing music, and, when so, controls the navigation device 100 to prevent the audio content from being output.

Figure 8:
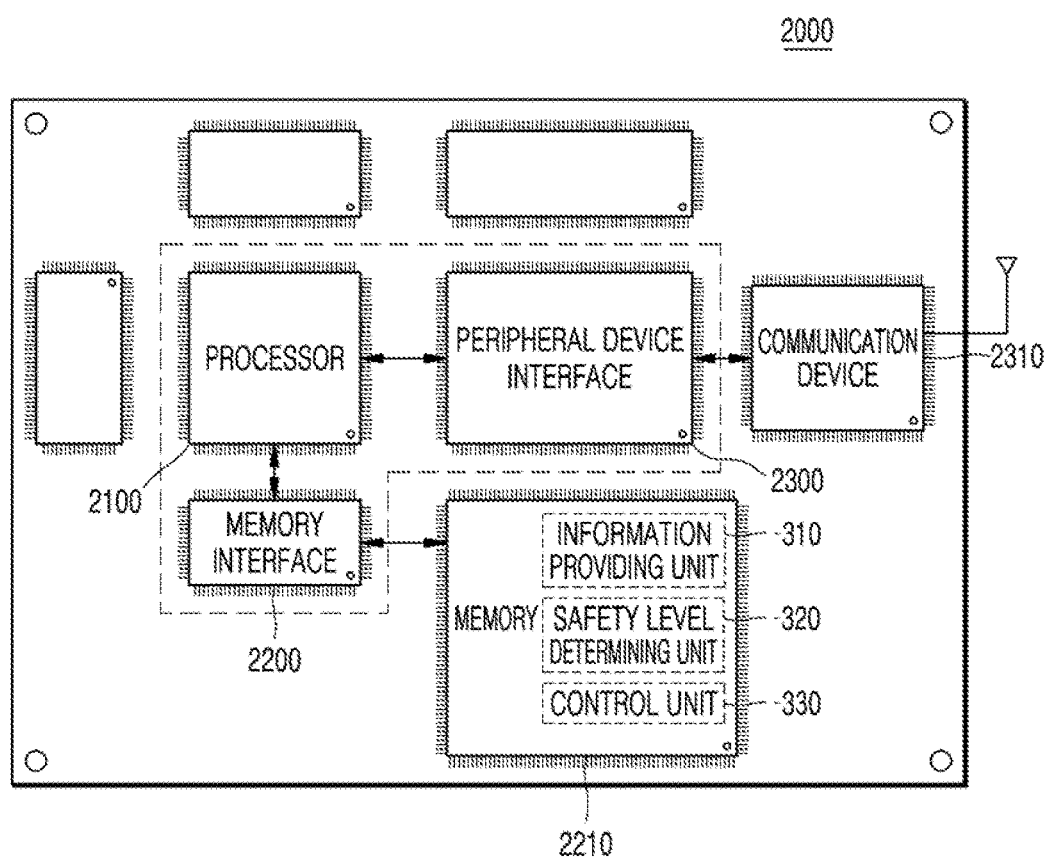
FIG. 8 is a schematic configuration of a hardware system according to another embodiment of the present invention.

FIG. 8 is a diagram showing a configuration of a hardware service system for implementing the navigation server 300 according to another embodiment of the present invention.

As shown in FIG. 8, the hardware system 2000 according to another embodiment of the present invention can have a configuration including a processor 2100, a memory interface 2200, and a peripheral interface 2300.

These inner components of the hardware system 2000 can be separate components or integrated in at least one integrated circuit, and these components can be coupled with a bus system (not shown).

Here, the bus system is the abstraction representing adequate bridges, adapters, and/or arbitrary one or more separate physical bus connected via a controller, communication lines/interfaces, and/or multi-drop or point-to-point connections.

The processor 2100 can execute various software modules included in a memory 2210 by communicating with the memory 2210 via the memory interface 2200 to enable the hardware system to perform various functions.

Here, the position information identifying unit 310, the safety level determining unit 320, and the content output control unit 330, which are described as main components of the navigation server 300 explained by referring to FIG. 7, can be stored as software modules in the memory 2210, and an operation system can be additionally stored in the memory.

As for the operation system (for example, I-OS, Android, Darwin, RTXC, LINUX, UNIX, OS X, WINDOWS, or an embedded operation system such as VxWorks) includes various procedures, command sets, software components and/or drivers which control and manage normal system tasks (for example, memory management, storage device control, power management, etc.), and serves to facilitate the communication among various hardware modules and software modules.

For reference, the memory 2210 can include a memory hierarchical structure including but not limited to a cache, a main memory, and a secondary memory, and the memory hierarchical structure can be implemented through an arbitrary combination of a random access memory (RAM) (for example, a static random access memory (SRAM), a dynamic random access memory (DRAM), a display dynamic random access memory (DDRAM)), a read only memory (ROM), a FLASH memory, a magnetic and/or optical storage device (for example, a disk drive, a magnetic tape, a compact disk (CD) and a digital video disc (DVD), etc.).

The peripheral device interface 2300 serves to facilitate the communication between the processor 2100 and peripheral devices.

As for the peripheral device, it is for providing different functionalities to the computer system and can include, for example, a communication device 1320 according to an embodiment of the present invention.

The communication device 2310 serves to provide the communication functionality with other devices, includes but is not limited to, for example, an antenna system, a radio frequency (RF) transceiver, at least one amplifier, a tuner, at least one oscillator, a digital signal processor, a CODEC chipset, a memory, etc., and can include a known circuitry for performing these functionalities.

The communication protocol which is supported by the communication device 2310 includes, for example, long term evolution (LTE), time division multiple access (TDMA), code division multiple access (CDMA), global system for mobile communications (GSM), enhanced data GSM environment (EDGE), wideband code division multiple access (W-CDMA), Wi-Fi (IEEE 802.11a, IEEE 802.11b, IEEE 802.11g and/or IEEE 802.11n, etc.), bluetooth, Wi-MAX, voice over Internet protocol (VoIP), and protocols for email, instant messaging, and a short message service (SMS), and protocols, which are not limited to these and provide a communication environment with other devices, can also be included in the communication protocol.

As a result, the inner components of the navigation device 300 which are stored as software modules in the memory 2210, communicate with the communication device 1320 by way of the memory interface 2200 when executed by the processor 2100, such that the exposure frequency of the content is maximized in the navigation device 100 while minimizing the danger due to watching of the content while driving.

In the following, inner components of the hardware system 2000, which controls the output of the content, are explained in detail by referring to FIG. 8, and it is assumed to explain in a more convenient way that the inner components of the navigation server 300, which are stored in the memory 2210 as software modules, have been executed by the processor 2100 by way of the memory interface 2200.

Before rushing to the detailed explanation, it is to be noted that the navigation device 100 receives the content, which is received in a push method from the content server 200 to the navigation application, and examples of the content include various types of advertisements and news.

The received content includes the video content and the audio content and can be provided in a digital data format pursuant to various known file formats or compression types, or can be divided into video and audio to be outputted from the navigation device 100.

The information providing unit 310 serves to provide the navigation-related information (for example, a map, path information, peripheral information, etc.) to the navigation device 2310 through the communication device 2310.

That is, when the information related to a navigation function is requested from the navigation device 100, the information providing unit 310 can provide the additional information such as real time traffic information, etc., which is related to the position information and path information provided by the navigation device 100, for example, the navigation-related information (for example, a map, path information, peripheral information, etc.) to the navigation device 100.

Certainly, the information providing unit 310 can also provide the navigation-related information (for example, a map, path information, peripheral information, etc.) to the navigation device 100 whenever a preset period time arrives irrespective of the request from the navigation device 100.

As a result, the information providing unit 310 can provide the navigation-related information (for example, a map, path information, peripheral information, etc.) to the navigation device 100 by driving the communication device 2310 in the hardware system 2000 by using the memory interface 2200 and the peripheral device interface 2300.

The safety level determining unit 320 identifies the current moving speed and the position of the moving object on which the navigation device 100 is attached or mounted by using the communication device 2310.

For example, the safety level determining unit 320 can request the current moving speed and the position of the moving object to the navigation device 100 in a periodic manner.

In this case, the navigation device 100 identifies the current moving speed and the position of the moving object according to the request from the navigation server 300, and can provide the current moving speed and the position of the moving object to the navigation server 300.

That is, when the GPS signals which are transmitted from the GPS satellites 400 are received, the navigation device 100 can determine current position coordinates according to the GPS signals which are received from the GPS satellites 400, and can identify an acceleration of the moving object by using an acceleration sensor (not shown) which senses the acceleration of the moving object. The position of the moving object is extracted from the map as coordinates, and it can be determined whether the moving object is currently moving or stopped according to a determined moving speed.

Meanwhile, the navigation device 100 identifies the current moving speed and the position of the moving object, and can provide the current moving speed and the position of the moving object to the navigation server 300, even when no request is received from the navigation server 300.

In this case, the safety level determining unit 320 can identify the current moving speed and the position of the moving object which are provided periodically from the navigation device 100.

Like this, although the procedure in which the navigation device 100 provides the current moving speed and the position of the moving object to the navigation server 300 can be performed by the navigation device 100 itself without an intervention from the navigation server 300, it is assumed that the safety level determining unit 320 requests the current moving speed and the position of the moving object to the navigation device 100 whenever the predetermined period arrives.

When the current moving speed and the position of the moving object are identified by using the navigation device 100, the safety level determining unit 320 determines the safety level information on the output of the content based on the identified position information.

Here, the safety level information represents the possibility of a negligent accident during a maneuver of the moving object at the time of outputting the content, and the safety level information can be used as a criterion for determining whether the content is to be output or the type of the output of the content.

As a result, by driving the communication device 2310 in the hardware system 2000 by using the memory interface 2200 and the peripheral interface 2300, the safety level determining unit 320 can identify the current moving speed and the position of the moving object.

The safety level information can be classified into a plurality of grades, and an example having three grades such as high, middle, and low from the highest safety level will be explained in the following.

The control unit 330 controls the output of the content for the navigation device 100 according to the safety level information which is identified by the safety level determining unit 320.

That is, the control unit 330 can control the output of the content for the navigation device 100 by delivering to the navigation device 100 a content output control signal for the navigation device 100 according to the safety level information, which is identified by the safety level determining unit 320, by driving the communication device 2310 in the hardware system 2000 by using the memory interface 2200 and the peripheral device interface 2300.

The procedure in which the control unit 330 controls the output of the content to the navigation device 100 will be explained in more detail as follows.

The safety level determining unit 320 can determine that the safety level is low when the moving object is moving or when the moving object is moving at a speed higher than or equal to a predetermined speed (for example, 20 km/h).

In this case, the control unit 330 can block the output of the content on the navigation device 100 even when the navigation device 100 has received the content from the content server 200. Also, the control unit 330 controls the navigation device 100 such that the navigation device 100 stores the blocked content in an internal storage of the navigation device 100.

Then, the control unit 330 controls whether the content is to be output to the navigation device 100 after re-determining the safety level while the moving object, to which the navigation device 100 is attached or mounted, is stopped, and controls the navigation device 100 such that the navigation device 100 deletes the output content from the internal storage of the navigation device 100.

When it is identified that the moving object is stopped, the safety level determining unit 320 identifies place information which is matched with the identified position of the moving object.

As described in the above, the position of the moving object can be extracted on the map as coordinates and displayed. Also, map information can be stored to be matched with places (a crossroad, a highway, a gas station, a parking lot, etc.) which are located at respective coordinates. Therefore, the safety level determining unit 320 can search for the place at the position coordinates which are matched with (or adjacent to) the identified position coordinates of the moving object, and then determine that the moving object is stopped at the corresponding place.

By referring to FIG. 3, when the position coordinates of the moving object correspond to position A, it can be identified that the current place is on the crossroad; when they correspond to position B, it can be identified that the current place is on the parking lot; and it can be identified that position C corresponds to the gas station.

When the place information of the moving object is identified, the safety level determining unit 320 can predict the stop period of the moving object after the moving object is stopped.

For example, when the moving object is at the crossroad in FIG. 3, it can be estimated that the moving object is stopped for a next signal, and the stop period will be short. In this case, it can be dangerous to output the video content on the navigation device 100 or manipulate a graphical user interface (GUI) which is related to the content.

Therefore, when the current place information of the moving object corresponds to the crossroad, the safety level determining unit 320 determines that the safety level is middle.

In this case, in order not to distract a user's attention by outputting the video content, the control unit 330 can control the navigation device 100 such that the navigation device extracts only the audio content and then output the extracted audio content in a sound format.

In addition, the audio content also can distract the attention of the user when it is exposed too often, so an output period of the audio content can be controlled such that the audio content is output at intervals longer than a predetermined time interval.

Meanwhile, when the position coordinates of the moving object correspond to the position B or the position C in FIG. 3, that is, when the position coordinates correspond to the parking lot or the gas station, the moving object is normally stopped for a longer time, and, therefore, the stop period of the moving object can be predicted to be somewhat longer.

In this case, the possibility of for a dangerous situation is low even when the user watches a screen or manipulates the GUI, and therefore the safety level determining unit 320 determines that the safety level is high and the control unit 330 can control the navigation device 100 to output the video content and the audio content in a display format and a sound format, respectively.

Meanwhile, the realized articles of functional operations and subject matters described in this specification can be implemented using digital electronic circuits, or implemented as computer software, firmware, or hardware including the configuration disclosed in this specification and structural equivalents thereof, or as a combination be at least one of these implementations. The articles of realization of the subject matter described in this specification can be implemented as one or more computer program product, that is, one or more module related to computer program instructions which are encoded on a tangible program storage medium for controlling the operation of the process system or for being executed by the same.

The computer-readable medium can be a machine-readable storage device, a machine-readable storage board, a memory device, a composition of materials affecting machine-readable wave signals, and a combination of at least one of them.

The term such as "a system" or "a device" in this specification encompasses all tools, devices, and machines for processing data including, for example, a programmable processor, a computer, or a multi-processor. The process system can include a code for creating an execution atmosphere for the computer program, when requested by a code constituting a processor firmware, a protocol stack, a database management system, an operating system, or a combination of at least one of them, etc., in addition to a hardware.

The computer (also known as a program, a software, a software application, a script, or a code) can be created in all types of program languages including a compiled or interpreted language or a priori or procedural language, and can be arranged in all types including standalone programs, modules, subroutines, and other units proper to be used in a computing environment. The computer program does not necessarily correspond to a file of a file system. The program can be stored in a single file provided by the requested program, in multiple files which interact with each other (for example, files storing one or more module, low level programs or some of the code), or in a part of the file containing other programs or data (for example, one or more script stored in a markup language document). The computer program can be arranged to be positioned in one site or distributed over a plurality of sites, such that it can be executed on multiple computers interconnected via a communication network or on a single computer.

Meanwhile, the computer-readable medium which is proper for storing computer program instructions and data can include and all types of nonvolatile memories, media, and memory devices including a semiconductor memory device such as EPROM, EEPROM and flash memory device, a magnetic disk such as internal hard disk or removable disk, optical disk, a CD-ROM and a DVD-ROM disk. The processor and the memory can be supplemented by a special purpose logic circuit or integrated into the same.

The article of realization of the subject matter described in this specification can include a back-end component such as a data server, a middleware component such as an application server, or a front-end component such as a client computer having a web browser or a graphic user interface which enables a user to interact with the article of realization of the subject matter described in this specification, or can implement all combinations of these back-end, middleware, or front-end components in a computing system. The components of a system can be interconnected with each other by all types or media of digital data communication such as a communication network.

Although this specification includes details of various specific implementations, it is not to be understood as limiting for all inventions or scope to be claimed, and it should rather be understood as an explanation for the features which can be unique to specific implementations of the specific invention. Similarly, the specific features described in this specification in the context of separate implementations can be implemented to be combined in a single implementation. On the contrary, various features described in the context of the single implementation can also be implemented as discrete or proper low level combinations as well as in various implementations. Furthermore, although the features can be depicted as work in a specific combination and as claimed in the first place, one or more features from the claimed combination can be excluded from the combination in some cases, and the claimed combination can be changed to the low level combinations or subcombinations.

Also, although this specification depicts the operations in a specific order in the drawings, it is not to be understood that this specific sequence or order should be maintained or all the shown operations should be performed in order to obtain the preferred results In specific cases, multitasking and parallel processing can be preferable. Also, the division of various system components of the aforementioned embodiments are not to be construed as being required by all embodiments, and it is to be understood that the described program components and systems can generally be unified into a single software product or packaged in multiple software products.

Similarly, this specification is not intended to limit the present invention to specific terms provided. Therefore, although the present invention has been explained in detail by referring to the aforementioned examples, it is possible for the person having ordinary skill in the art to alter, change, or modify these examples without departing from the scope of the present invention. The scope of the present invention is expressed by the claims, not by the specification, and all changes and modified shapes derived from the meanings of the claims, scopes, and the equivalents thereof are construed to be included in the scope of the present invention.

What is claimed is:

1. A navigation device for controlling an output of content, comprising:
    a position identifier configured to provide position information corresponding to a moving speed of an object and a location of the object;
    a communicator configured to receive, via a network, a content from a content server and stop period information corresponding to a stop period at the location of the object from a navigation server, wherein the received content comprises an audio content and a video content;
    a memory configured to store the received content;
    a speaker configured to output the audio content;
    a display configured to output the video content; and
    a processor connected with the position identifier, the communicator, the speaker, and the display, the processor configured to:
        receive the position information, the stop period information and the content;
        identify the moving speed of the object and the location of the object based on the received position information;
        identify the stop period corresponding to the identified location from the stop period information;
        determine a safety level based on at least one of the identified moving speed of the object, the identified location of the object, or the identified stop period,
        when it is determined that the safety level is low, block the received content such that neither the audio content nor the video content is output, wherein the safety level is low at least when the identified moving speed is greater than a predetermined speed;
        when it is determined that the safety level is medium, control the received content such that only the audio content is output for a predetermined interval and the video content is not output, wherein the safety level is medium at least when the identified stop period is less than a predetermined amount of time; and
        when it is determined that the safety level is high, allow output of both the audio content and the video content, wherein the safety level is high at least when the identified stop period is greater than or equal to the predetermined amount of time.

2. A method of controlling an output of content of a navigation device implemented by a processor, the method comprising:
    receiving, through a position identifier, position information corresponding to a moving speed of an object and a location of the object;
    receiving, through a communicator, a content from a content server and stop period information corresponding to a stop period at the location of the object from a navigation server via a network, wherein the received content comprises an audio content and a video content;

causing a memory to store the received content;

causing a speaker to output the audio content;

causing a display to output the video content;

receiving the position information, the stop period information and the content;

identifying the moving speed of the object and the location of the object;

identifying the stop period corresponding to the identified location from the stop period information;

determining a safety level based on at least one of the identified moving speed of the object, the identified location of the object, or the identified stop period;

when it is determined that the safety level is low, blocking the received content such that neither the audio content nor the video content is output, wherein the safety level is low at least when the identified moving speed is greater than a predetermined speed;

when it is determined that the safety level is medium, controlling the received content such that only the audio content is output for a predetermined interval and the video content is not output, wherein the safety level is medium at least when the identified stop period is less than a predetermined amount of time; and when it is determined that the safety level is high, allowing output of both the audio content and the video content, wherein the safety level is high at least when the identified stop period is greater than or equal to the predetermined amount of time.

* * * * *